United States Patent
Essing

(10) Patent No.: US 6,783,022 B2
(45) Date of Patent: Aug. 31, 2004

(54) VENTILATION DEVICE FOR A FUEL TANK

(75) Inventor: Martin Essing, Bocholt (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/843,348

(22) Filed: Apr. 26, 2001

(65) Prior Publication Data

US 2001/0035421 A1 Nov. 1, 2001

(51) Int. Cl.[7] .............................................. B65D 25/38
(52) U.S. Cl. ...................... 220/562; 220/746; 220/913
(58) Field of Search ................................ 220/746, 562, 220/913; 96/181

(56) References Cited

U.S. PATENT DOCUMENTS

| | | | | |
|---|---|---|---|---|
| 3,910,302 A | * | 10/1975 | Sudhir | ........................ 220/746 |
| 5,085,773 A | * | 2/1992 | Danowski | |
| 5,431,144 A | | 7/1995 | Hyodo et al. | ................ 123/520 |
| 5,694,968 A | * | 12/1997 | Devall et al. | |
| 5,730,183 A | | 3/1998 | Kremsler | ................. 137/493.8 |

FOREIGN PATENT DOCUMENTS

| | | | |
|---|---|---|---|
| AT | 003 803 | 9/1999 | ......... B60K/15/035 |
| DE | 30 37 827 A1 | 4/1981 | |
| DE | 43 12 374 | 10/1994 | ......... B60K/15/035 |
| DE | 43 29 876 A1 | 3/1995 | |
| DE | 195 23 645 | 1/1997 | ........... F16K/24/00 |
| DE | 196 32 690 | 2/1998 | ........... F16K/24/04 |
| EP | 0 754 630 A1 | 4/1996 | |
| EP | 0 869 022 | 12/1997 | ......... B60K/15/035 |
| FR | 2 262 609 | 3/1974 | ........... B60K/15/02 |
| FR | 2 774 951 | 2/1998 | ......... B60K/15/035 |
| FR | 2 756 518 A1 | 6/1998 | |
| WO | 95/03949 | 2/1995 | ......... B60K/15/035 |

* cited by examiner

*Primary Examiner*—Stephen Castellano
(74) *Attorney, Agent, or Firm*—Cohen, Pontani, Lieberman & Pavane

(57) ABSTRACT

A ventilation device for a fuel tank includes an antisurge element designed as a porous component manufactured from sintered plastic. The antisurge element prevents fuel which is sloshing around in the fuel tank from penetrating into an activated carbon filter of the ventilation device. The antisurge element is a fixed component that does not require any movable parts and is produced particularly cost-effectively.

5 Claims, 1 Drawing Sheet

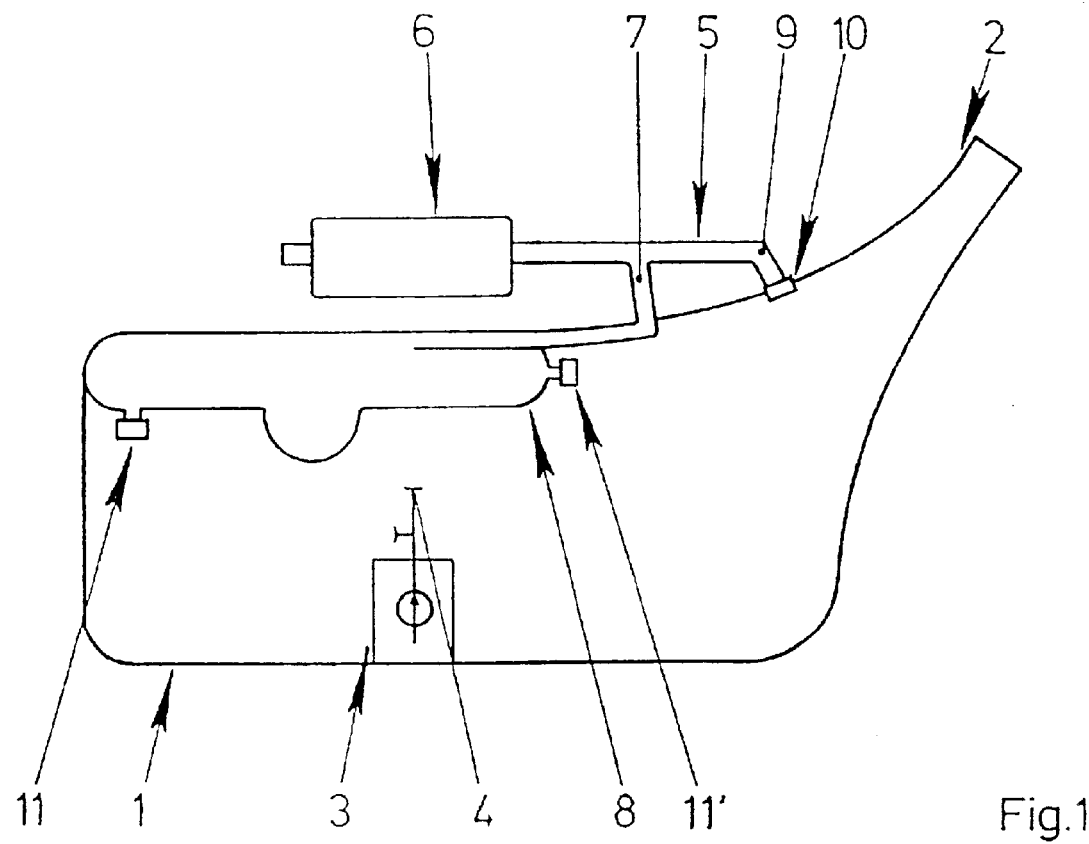
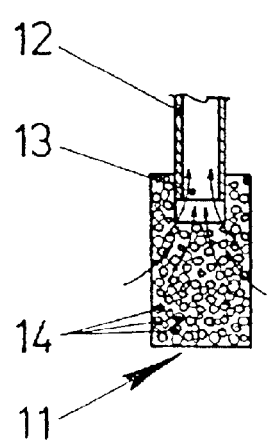
Fig. 2
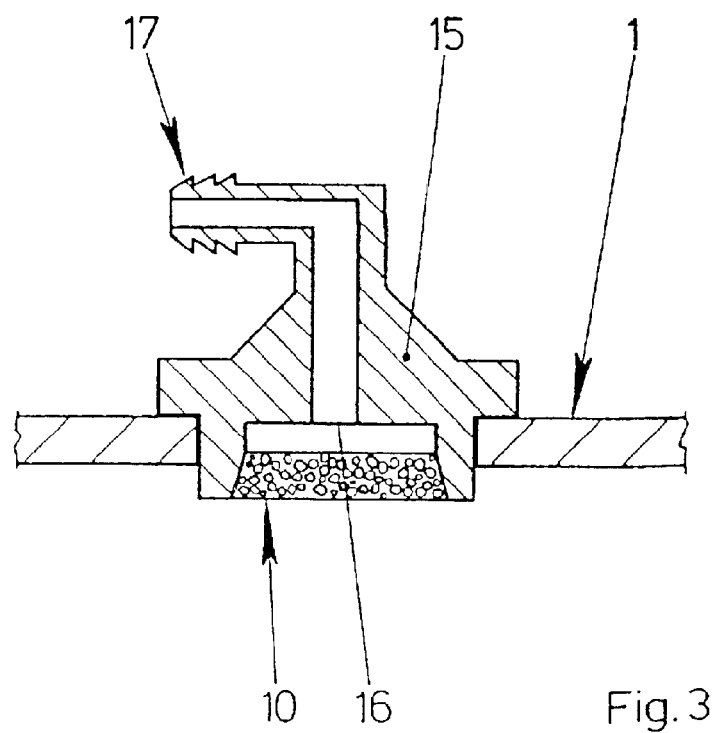
Fig. 3

VENTILATION DEVICE FOR A FUEL TANK

BACKGROUND OF THE INVENTION

1. Field of the Invention

The invention relates to a ventilation device for a fuel tank having an equalizing opening arrangable in a fuel tank for equalizing a pressure in the fuel tank with an ambient pressure surrounding the fuel tank and having an antisurge element arranged in front of the equalizing opening.

2. Description of the Related Art

Ventilation devices for equalizing the pressure in a fuel tank with ambient pressure connect that region of the fuel tank which is not filled with fuel to the ambient surroundings via an activated carbon filter and are known in practice. The ventilation device allows air to flow from the surroundings into the fuel tank as the fuel is consumed and for gases to escape from the fuel tank when there is thermal expansion of the fuel or when the tank is filled via a filler neck. Ventilation devices which are known in practice have a float valve or a return surge flap as the antisurge element. When the fuel is sloshing around within the fuel tank, this antisurge element prevents fuel from penetrating through the ventilation opening into the ventilation line. The antisurge element prevents fuel from penetrating into the activated carbon filter and therefore from damaging it.

A problem of the known antisurge elements is that they have movable components and are therefore very susceptible to failure. Furthermore, the known antisurge elements require very cost-intensive mounting or guidance for the movable component and sealing surfaces of complicated design.

SUMMARY OF THE INVENTION

It is an object of the present invention to provide a ventilation device for equalizing the pressure in a fuel tank with the ambient pressure surrounding the fuel tank such that the ventilation device has a structure which is particularly unsusceptible to failure and may be manufactured cost-effectively.

The object of the present invention is achieved by a ventilation device for a fuel tank having an equalizing opening for equalizing the pressure in the fuel tank with the surrounding ambient air and an antisurge element designed as a fixed component with a plurality of channels. Each of the plural channels of the antisurge element has a small diameter in comparison to the equalizing opening.

The pressure in the fuel tank is equalized with the surroundings via the channels. Because of their small diameter, the channels offer a substantially smaller resistance to a gas flow than to a liquid flow. The larger resistance to liquid flow prevents fuel that is sloshing around in the fuel tank from penetrating into the ventilation line. However, the channels nevertheless provide sufficient equalization of the pressure. Since the ventilation device does not require any movable components in the region of the antisurge element, it has a structure which is particularly unsusceptible to failure and may be manufactured cost-effectively.

The antisurge element may, for example, have a plurality of lattices which are arranged one behind another and have a designated mesh width. However, according to an advantageous development of the invention, fuel which is sloshing around against the antisurge element is reliably held back if the antisurge element is designed as a porous sintered part.

According to another embodiment of the present invention, the antisurge element is particularly cost-effective if it is manufactured from plastic. A sintering process for plastic is known, for example, from the manufacture of floats for fuel tanks. The sintering process includes producing granules made entirely of plastic by extrusion and pressing the plastic granules while they are hot. The diameters of channels produced between the granule grains may be set by adjusting the grain size of the plastic granules, the temperature of the granules during the step of pressing and the amount of pressure used during the sintering process.

According to another embodiment of the present invention, the installation of the antisurge element proves to be particularly simple if the antisurge element is welded, clipped or pressed to the component having the equalizing opening.

The equalizing openings are frequently formed by open ends of ventilation lines. According to another embodiment of the present invention, the fastening of the antisurge element in front of the equalizing opening proves to be particularly simple if the antisurge element partially surrounds a ventilation line in which the equalizing opening is arranged in the region of the equalizing opening.

According to yet another embodiment of the present invention, the antisurge element are connectable to ventilation lines of virtually any design when the antisurge element is made of a disk-shaped design and is inserted in a connecting nipple designed for connection to a ventilation line. In ventilation lines guided outside the fuel tank, the connecting nipple may simply be inserted into the wall of the fuel tank.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 1 is a schematic longitudinal sectional view of a fuel tank with a ventilation device according to an embodiment of the present invention;

FIG. 2 is an enlarged longitudinal sectional view of one of the antisurge elements of the ventilation device of FIG. 1; and FIG. 3 is an enlarged longitudinal sectional view of another of the antisurge elements of the ventilation device of FIG. 1.

DETAILED DESCRIPTION OF THE PRESENTLY PREFERRED EMBODIMENTS

FIG. 1 shows a fuel tank 1 with a filler neck 2 through which fuel may be poured for filling the fuel tank 1. A fuel delivery unit 3 arranged in the fuel tank 1 delivers fuel via a feed line 4 to an internal combustion engine (not illustrated) of a motor vehicle. The fuel tank 1 also has a ventilation device 5 with an activated carbon filter 6 arranged outside the fuel tank 1. A ventilation line 7 connects the activated carbon filter 6 to a collecting tank 8 arranged within the fuel tank 1. A further ventilation line 9 connects the activated carbon filter 6 to an antisurge element 10 arranged in a wall in an upper region of the fuel tank 1. The collecting tank 8 is connected to the remaining regions of the fuel tank 1 via two further antisurge elements 11, 11'.

The ventilation device 5 allows gases to escape via the activated carbon filter 6 as the fuel tank 1 is being refueled via the filler neck 2 or when the fuel in the fuel tank 1 is heated. Furthermore, the ventilation device 5 also allows air to flow in from the surroundings into the fuel tank 1 as fuel is consumed. The antisurge elements 10, 11, 11' prevent fuel which is sloshing around within the fuel tank 1 from entering the ventilation lines 7, 9 which are arranged outside the fuel tank 1. The fuel is thereby also prevented from entering and damaging the activated carbon filter 6 of the ventilation device 5.

FIG. 2 is a greatly enlarged view of the antisurge element 11 arranged on the collecting tank 8 as shown in FIG. 1. The antisurge element 11 is of cylindrical design and is fastened on a connecting branch 12 of the collecting tank 8. A free end the connecting branch 12 has an equalizing opening 13 which is covered by the antisurge element 11. The antisurge element 11 includes a plurality of plastic grains 14 which are pressed together. The plastic grains 14 delimit channels which are provided for fuel vapors and air to flow through. For clarification, arrows are shown in FIG. 2 to indicate the air flow and/or fuel vapor flow through the channels. The antisurge element 11 surrounds the free end of the connecting branch 12 and is welded thereto. The antisurge element 11' of FIG. 1 may have the same configuration as the antisurge element 11.

FIG. 3 shows the antisurge element 10 which is arranged in the wall of the fuel tank 1 as depicted in FIG. 1. The antisurge element 10 has a disk-shaped design and is welded to a connecting nipple 15. The side of the connecting nipple facing the fuel tank 1 has an equalizing opening 16 which is covered by the antisurge element 10. The connecting nipple 15 is itself welded to the wall of the fuel tank 1 and has a connecting piece 17 for connection with the ventilation line 9 (see FIG. 1). The connecting piece 17 is shown as a push-on connecting piece in which the ventilation line is pushed on over the connecting piece 17 to complete the connection. Alternatively, the connecting piece 17 may comprise other types of connecting pieces such as, for example, threaded connectors and clamped connectors.

Of course, the antisurge elements 11, 11' arranged on the collecting tank 8 may alternatively comprise disk-shaped elements connected to the collecting tank via a connecting nipple and the antisurge element 10 may alternatively comprise a cylindrical element surrounding a connecting branch on the wall of the fuel tank.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A ventilation device for a fuel tank having an equalizing opening arrangeable in the fuel tank for equalizing a fuel tank pressure in the fuel tank with an ambient pressure surrounding the fuel tank, said ventilation device comprising an antisurge element arranged in front of said equalizing opening, said antisurge element comprising a fixed porous sintered part having a plurality of individual channels, each of said plural individual channels having a diameter that is smaller than a diameter of said equalizing opening and having a length that is larger than the diameter of said each of said plural individual channels, wherein a configuration of said plural individual channels is operatively arranged for allowing a flow of a gas medium therethrough and producing a resistance to liquid flow which prevents sloshed fuel in the fuel tank which splashes against said antisurge element from flowing completely through said plural individual channels in said fixed porous sintered part such that the sloshed fuel is prevented from entering said ventilation device.

2. The ventilation device of claim 1, wherein said antisurge element is manufactured from plastic.

3. The ventilation device of claim 1, further comprising a component on which said equalizing opening is arranged, said antisurge element being connected to said component with said equalizing opening via one of a welded, clipped and pressed connection.

4. The ventilation device of claim 1, further comprising one of a connecting branch connected with said equalizing opening and having a free end, wherein said antisurge element surrounds said free end of said connecting branch.

5. The ventilation device of claim 1, further comprising a ventilation line connected with said equalizing opening and a connecting nipple connectable with said ventilation line, wherein said antisurge element has a disk-shaped design and is inserted in said connecting nipple.

* * * * *

UNITED STATES PATENT AND TRADEMARK OFFICE
CERTIFICATE OF CORRECTION

PATENT NO. : 6,783,022 B2
DATED : August 31, 2004
INVENTOR(S) : Martin Essing

It is certified that error appears in the above-identified patent and that said Letters Patent is hereby corrected as shown below:

Title page,
Item [30], Foreign Application Priority Data, please insert
-- [30] Foreign Application Priority Data, April 26, 2000  (DE)  100 0 296.9 --

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,783,022 B2
DATED : August 31, 2004
INVENTOR(S) : Martin Essing

It is certified that error appears in the above-identified patent and that said Letters Patent is hereby corrected as shown below:

<u>Title page,</u>
Insert Item -- [30], Foreign Application Priority Data,
      April 26, 2000      (DE)      100 20 296.9 --.

Signed and Sealed this

First Day of November, 2005

JON W. DUDAS
*Director of the United States Patent and Trademark Office*